Figure 1:
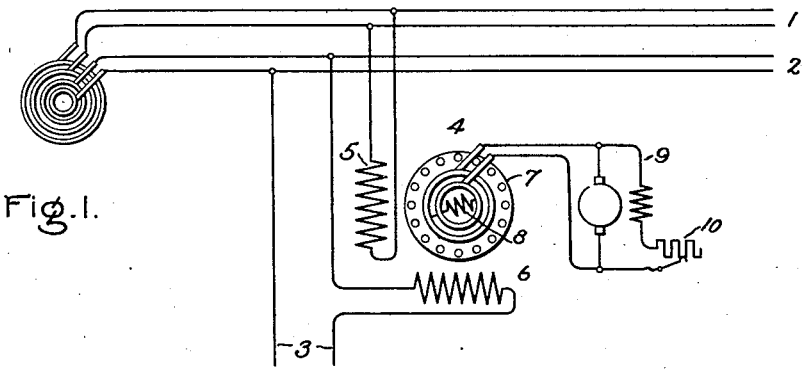

E. F. W. ALEXANDERSON.
SYSTEM OF PHASE MODIFICATION.
APPLICATION FILED FEB. 23, 1917.

1,300,543.

Patented Apr. 15, 1919.

Inventor:
Ernst F. W. Alexanderson
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF PHASE MODIFICATION.

1,300,543. Specification of Letters Patent. Patented Apr. 15, 1919.

Application filed February 23, 1917. Serial No. 150,412.

*To all whom it may concern:*

Be it known that I, ERNST F. W. ALEXANDERSON, a citizen of the United States, residing at Schenectady, in the county of Schenectady, State of New York, have invented certain new and useful Improvements in Systems of Phase Modification, of which the following is a specification.

My invention relates to systems of electrical distribution and more particularly to a system in which a phase converter of the polyphase motor type is employed, in connection with a polyphase supply circuit and a single phase load circuit supplied from said polyphase circuit, to nullify the unbalancing tendency of the single phase load or in which such a converter is employed in connection with a single phase supply circuit and a polyphase load circuit to transform single phase energy to polyphase energy.

It is well known that a single phase alternating current may be converted into a polyphase alternating current by means of a phase converter constructed like a polyphase induction motor. The converter may be arranged with one phase serially interposed between the single phase circuit and one phase of the polyphase circuit, and another or other phases connected across another or other phases of the polyphase circuit, in which case the so-called series arrangement is obtained.

With this arrangement, whether the single phase circuit or the polyphase circuit be the supply circuit, by properly proportioning and connecting the converter windings a balance between the polyphase currents can be effected for any predetermined value of the load although upon variation of the load from said predetermined value some unbalancing of the polyphase currents occurs.

Hitherto in systems of the kind indicated, the converter has been provided with an ordinary phase wound or squirrel cage rotor so that the magnetization of the converter has been effected by means of the stator windings.

I have discovered that if the converter, when connected according to the series arrangement, be excited by means of a winding carried by the rotor and the degree of excitation be adjusted, the power factor of the system can be improved and, furthermore, if the degree of excitation be properly adjusted, the theoretically correct phase relation between the polyphase currents and the desired ratio, or balance, of polyphase currents will be automatically maintained at all loads. If, however, the synchronous excitation be not employed, the polyphase currents will not only not have the desired ratio, or balance, when the load departs from a predetermined value, but will have a phase relation which is other than the theoretically correct one.

An object of my invention, therefore, is to improve the operation of a system of phase balancing or phase conversion of the kind hereinbefore indicated, by synchronously exciting the converter independently of the converter windings which are connected to the single phase or polyphase circuits. Another object of my invention is to provide improvements in a system of the character referred to, whereby the theoretically correct phase relation and the desired ratio, or balance, between the polyphase currents will be automatically maintained at all loads, and furthermore whereby the power factor of the system may be increased.

To accomplish the various objects hereinbefore mentioned, I propose to employ, in the system, a converter of the induction motor type having relatively rotatable members, one of which is provided with windings adapted for appropriate connection to the single and polyphase circuits and the other of which is provided with a distributed short-circuited winding and a winding adapted to be supplied with direct current.

Figure 2:
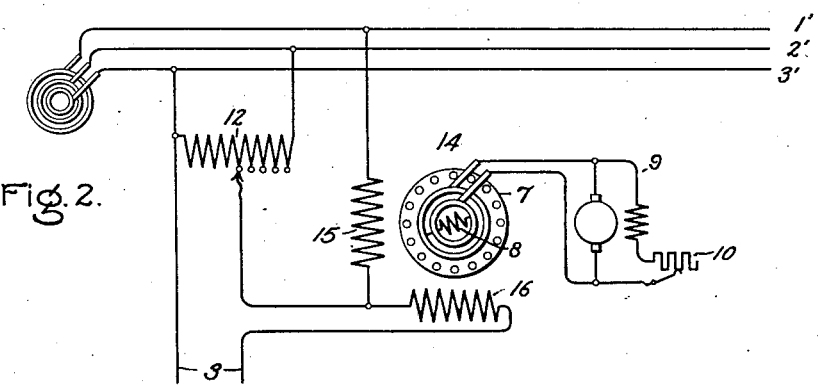
Figure 3:
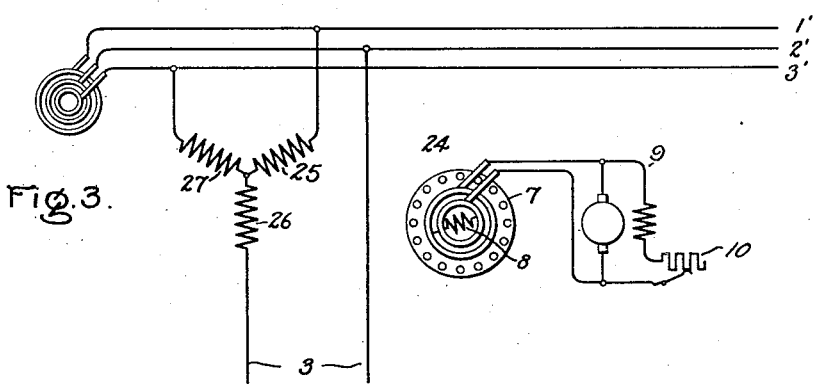

My invention will be more readily understood from the following description, when taken in connection with the accompanying drawings, in which Figure 1 is a diagram showing an embodiment of my invention involving a two phase circuit; Fig. 2 is a diagram showing one embodiment of my invention involving a three-phase circuit; and Fig. 3 is a diagram showing another embodiment of my invention involving a three-phase circuit.

Although in each of the figures a source of alternating current is shown connected to the polyphase circuit, it should be noted that when the polyphase circuit constitutes the consumption circuit the single phase circuit supplies in whole or in part the energy to the polyphase circuit.

Considering the arrangement shown in

Fig. 1, the polyphase circuit comprising phases 1 and 2, is adapted alternatively to supply energy to or to receive energy from the single phase mains 3. The phase converter 4 is provided with a plurality of stator windings, one of said windings 5 being connected to phase 1 of the polyphase circuit and the other 6 being connected to phase 2 of the polyphase circuit in series with the single phase circuit 3. Said converter has a rotor 7, which is provided with a distributed short-circuited winding and a winding 8 adapted to be supplied with direct current from the exciter 9. The field of the exciter may be varied by means of the variable resistance 10.

Similarly in the modification shown in Fig. 2, the polyphase circuit, comprising phases 1', 2' and 3', is adapted alternatively to supply energy to or to receive energy from the single phase mains 3. The converter 14 is provided with a plurality of stator windings, one of said windings 15 being connected to one phase 1' of the polyphase circuit and to an intermediate point on the transformer winding 12, which is connected across phases 2' and 3', and the other winding 16 being connected in series with the single phase circuit 3 to phase 3' and said intermediate point on the transformer winding 12. As in the modification shown in Fig. 1, the converter has a rotor 7 which is provided with a distributed short-circuited winding and a winding 8 adapted to be supplied with direct current from the exciter 9.

Similarly in the modifications shown in Fig. 3, the polyphase circuit comprising the phases 1', 2' and 3', is adapted alternatively to supply energy to or to receive energy from the single phase mains 3. The converter 24 is provided with three-phase, star-connected stator windings 25, 26 and 27. The terminals of windings 25 and 27 are connected, respectively, to phases 1' and 3' of the polyphase circuit and the terminal of the other winding 26 is connected through the single phase circuit 3 to the phase 2'. As in the modifications shown in Figs. 1 and 2, the converter has a rotor 7, which is provided with a distributed short-circuited winding and a winding 8 adapted to be supplied with direct current from the exciter 9.

It is, of course, obvious that any source of direct current for the excitation of the rotor winding 8 may be substituted, if desired, for the exciter 9.

In the modifications, shown in Figs 1, 2 and 3, by reason of the fact that the direct current excitation of the rotor may be adjusted so that no magnetizing current flows in the stator windings of the converter it is possible to so design and proportion said windings that with the proper rotor excitation a predetermined ratio of the currents in the different phases will be automatically maintained at all loads and furthermore that the phase angle between the currents in the different phases will have the theoretically correct value under all load conditions. The ratio of currents desired may be one to one, or any other desired value, but whatever may be the selected ratio, if the excitation of the rotor is maintained at the proper amount, the said ratio will be maintained at all loads. Although ordinarily it is desired that the converter have the characteristics resulting with full excitation, by which is meant the excitation at which the polyphase voltages and currents will be maintained balanced at all loads, nevertheless it may be noted that a variation in the degree of rotor excitation modifies the converter characteristics. For example, if the rotor excitation be insufficient to fully excite the converter, the phase angle between the polyphase currents will be less than the theoretically correct angle and the ratio of the polyphase current values will vary as the load varies. On the other hand, if the rotor excitation be such that the converter is over excited, the phase angle between the polyphase currents will be greater than the theoretically correct angle and the ratio of the polyphase current values will vary as the load values. As the excitation of the converter is increased from under- to over-excitation the power factor of the converter is improved.

Assume that the stator windings of the converter are designed to give a current ratio of one to one in the different phases thereof, and that the converter is fully excited by means of the direct current winding carried by the rotor. If now the polyphase circuit constitute the source of energy and the single phase circuit constitute the load circuit, then, for all loads, the currents flowing in the several phases of the polyphase circuit by reason of the current taken by the single phase load circuit will be substantially equal and will have substantially the theoretically correct phase relation. If the single phase circuit constitutes the source of energy and the polyphase circuit the load circuit, substantially the same phase and value relation of polyphase currents is secured.

It is therefore evident that in the embodiment of my invention herein described I have provided a system peculiarly adapted to use where a moderate amount of power is to be converted from single phase to polyphase, or where a simplified phase balancer free from the complication attendant upon the use of automatic regulating means is desired, and where the load is variable.

Although, for brevity of expression, I have heretofore referred to that member of the converter, upon which are carried the windings which are connected to the polyphase and single phase circuits, as the stator, and that member which carries the winding to which the direct current source is connected, as the rotor, it is to be understood that the former member may be the rotary member and the latter member the stationary member.

It will be noted that part of the subject matter illustrated, described and claimed herein is disclosed in my copending application, Serial No. 815,280, filed January 29, 1914, and as to such subject matter this application is a continuation.

I conceive that various modifications of my invention may be made and I accordingly do not desire to be limited to the exact arrangement shown, but seek to cover in the appended claims all such modifications and arrangements as fall within the scope and spirit of my invention.

What I claim as new and desire to secure by Letters Patent of the United States, is:—

1. The method of supplying energy to a single-phase circuit from a polyphase circuit or vice versa by means of a phase converter comprising relatively rotatable members, one of which is provided with a short circuited winding and another of said members being provided with windings constituting a plurality of phases, which consists in passing the current flowing from one to the other of said circuits through one of said phases, thereby inducing currents in the other converter phases, synchronously exciting said converter independently of said phases and adjusting said excitation to such a value that the current in the phases will have a predetermined ratio and substantially correct phase relation at all loads.

2. The method of supplying energy to a single phase circuit from a polyphase circuit by means of a phase converter of the polyphase induction motor type comprising relatively rotatable members, one of which is provided with a distributed short circuited winding and another of which is provided with windings constituting a plurality of phases, which consists in passing the current consumed by the single phase circuit through one of said phases, thereby inducing currents in the other converter phases, synchronously exciting said converter independently of said phases and adjusting said excitation to such a value that the currents in the phases will have a predetermined ratio and the theoretically correct phase relating at all loads.

3. In combination, a three-phase circuit, a single phase circuit, one of said circuits being the supply circuit and the other being the load circuit, a phase converter comprising relatively movable members, one of said members being provided with a distributed short circuited winding and an exciting winding and another of said members being provided with windings constituting a plurality of phases, a transformer having a winding connected between the second and third phases of the three-phase circuit, one of the converter phases being connected between the first phase of the three-phase circuit and an intermediate point on said transformer winding, and another of the converter phases being connected in series with the single phase circuit between said intermediate point and the third phase of the three-phase circuit, and adjustable direct current means for energizing the exciting winding carried by the first named member.

In witness whereof, I have hereunto set my hand 21st day of February, 1917.

ERNST F. W. ALEXANDERSON.